(12) United States Patent
Kurasawa et al.

(10) Patent No.: US 8,504,881 B2
(45) Date of Patent: Aug. 6, 2013

(54) SWITCH DEVICE, SWITCH CONTROL METHOD AND STORAGE SYSTEM

(75) Inventors: Yusuke Kurasawa, Kawasaki (JP); Toshiaki Takeuchi, Kawasaki (JP); Masakazu Sakamoto, Kawasaki (JP); Tetsuya Kinoshita, Kawasaki (JP); Jun Takeuchi, Kawasaki (JP); Atsushi Shinohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 363 days.

(21) Appl. No.: 13/020,868

(22) Filed: Feb. 4, 2011

(65) Prior Publication Data
US 2011/0197091 A1 Aug. 11, 2011

(30) Foreign Application Priority Data
Feb. 5, 2010 (JP) .................... 2010-024538

(51) Int. Cl.
*G06F 11/00* (2006.01)
(52) U.S. Cl.
USPC .............................. 714/54; 714/48
(58) Field of Classification Search
USPC ................ 714/54, 42, 45, 48, 6.1, 4.1
See application file for complete search history.

(56) References Cited

U.S. PATENT DOCUMENTS
2008/0068739 A1* 3/2008 Oyamada et al. .............. 360/75
2009/0249148 A1* 10/2009 Ito et al. ........................ 714/746

FOREIGN PATENT DOCUMENTS
JP 2793087 6/1998

* cited by examiner

*Primary Examiner* — Dieu-Minh Le
(74) *Attorney, Agent, or Firm* — Fujitsu Patent Center

(57) ABSTRACT

A switch device includes a memory unit for storing therein an error response for each error event to be sent in response at the time of a failure with respect to a control signal that controls a storage device connected to the switch device, an error response output unit for receiving input of the control signal and sequentially outputting each error response stored in the memory unit, an operation information computing unit for detecting an operation of a calculating device, which is connected to the switch device, corresponding to each error response output by the error response output unit and for obtaining, as operation information, a condition defining the operation of the calculating device upon receiving each error response, and an operation setting unit for setting operation condition at the time of a failure based on the operation information.

7 Claims, 10 Drawing Sheets

FIG.5

| SCSI COMMAND | SCSI STATUS/SENSE | RETRY INTERVAL | RETRY COUNT/COMMAND TIMEOUT PERIOD |
|---|---|---|---|
| 0x00 | SENSE: 0x1/0x00/0x00 | | |
| 0x00 | SENSE: 0x1/0x00/0x01 | | |
| : | : | | |
| 0x00 | SENSE: 0x1/0xff/0xff | | |
| 0x00 | SENSE: 0x2/0x00/0x00 | | |
| : | : | | |
| 0x00 | SENSE: 0xf/0xff/0xff | | |
| 0x00 | SCSI STATUS: 0x1 | | |
| : | : | | |
| 0x00 | SCSI STATUS: 0xf | | |
| 0x00 | COMMAND TIMEOUT | | |
| 0x01 | SENSE: 0x1/0x00/0x00 | | |
| : | : | | |
| 0x01 | SENSE: 0xf/0xff/0xff | | |
| 0x01 | SCSI STATUS: 0x1 | | |
| : | : | | |
| 0x01 | SCSI STATUS: 0xf | | |
| 0x01 | COMMAND TIMEOUT | | |
| : | : | | |
| 0x01 | SCSI STATUS: 0xf | | |

231

SWITCH DEVICE, SWITCH CONTROL METHOD AND STORAGE SYSTEM

CROSS-REFERENCE TO RELATED APPLICATION

This application is based upon and claims the benefit of priority of the prior Japanese Patent Application No. 2010-024538, filed on Feb. 5, 2010, the entire contents of which are incorporated herein by reference.

FIELD

The embodiments discussed herein are directed to a switch device, a switch control method, and a storage system.

BACKGROUND

In recent years, it has become common to use storage systems that enable storing a high volume of data in a plurality a memory media. In such a storing system, for example, a network called a storage area network (SAN) is built between calculating devices and storage devices (memory media) with the use of switch devices (hereinafter, simply referred to as "switches") or cables. A calculating device is a server also called a host, while a storage device is also called a storage that includes a memory medium such as a hard disk drive. In order to perform reading or writing of data, frames including data or commands are communicated over the network between a calculating device and a storage device. In that case, the calculating device functions as an initiator and sends a command for data reading or data writing to the target storage device. Thus, in a storage system, a calculating device takes the initiative regarding the operations to be performed, while a storage device functions in a passive manner.

Besides, in recent years, in order to perform optical data communication between a calculating device and a storage device, a fibre channel (FC) is laid therebetween as a connection cable. In the case of using a fibre channel, the calculating device is configured with a host bus adapter (HBA) that includes a port for optical data communication. Particularly, a switch configured with a fibre channel is called a fibre channel switch (FC switch).

Meanwhile, as far as switches are concerned, there have been proposed virtual switches that have the function of virtualizing one or more physical memory media for the purpose of configuring one or more virtual disks. A virtual switch provides virtual disks that are configured therein as memory media to a calculating device. More particularly, a virtual switch configures, as virtual memory media, arbitrary areas in the physical memory media connected thereto. Besides, a virtual switch has the function of controlling the communication of control signals corresponding to the virtual memory media configured therein. In the following description, the term "memory medium" is assumed to also include a virtual memory medium.

To a storage area network are connected different types of calculating devices (for example, calculating devices having different manufacturers or different configurations). Naturally, in case of a failure during data communication between a calculating device and a memory medium, the operations (behavior) for retrial or file-over performed by the calculating device are different depending on the type of that calculating device. Besides, the operations for retrial or file-over also differ depending on the type of the communication unit (such as HBA) that performs communication with the memory media disposed in a calculating device. Hence, at the time when a virtual switch sends a failure notification to a calculating device, the virtual switch also needs to control the error handling such as switching of communication paths in synchronization with the operations performed by the calculating device. Thus, for the purpose of controlling the error handling, the operational person is forced to set the operations performed by the switches in a synchronizing manner with the operations performed by the calculating devices.

Explained below is the task of connecting a conventional calculating device and a conventional storage device. In the following explanation, the operating person performing the task of connecting a calculating device and a storage device is referred to as "operator". Firstly, at the time of newly connecting a calculating device and a storage device, the operator conducts a data communication test for the calculating device, the switch, and the storage device to be actually used and collects information on the operations performed by the calculating device. Based on the collected information, the operator creates a software program (firmware) for controlling the operations performed by the switch in such a way that the switch appropriately operates in synchronization with the operations performed by the calculating device. The operator repeats conducting the data communication test and creating firmware, and replaces the firmware of the switch with the final version of the firmware. As a result, data communication becomes possible between the calculating device and the storage device.

Meanwhile, for the purpose of conducting a test on a small computer system interface (SCSI) of a calculating device, a conventional technology has been disclosed for conducting the SCSI test with a pseudo-I/O device kept in a connected state (see, for example, Japanese Laid-open Patent Publication No. 06-52072).

However, in the abovementioned method, the operator needs to individually check the operations performed by the calculating device one by one, take appropriate actions on the checked operations, and carry on with checking the subsequent operations. Moreover, the operations of each calculating device differ depending on the combination of the type of that calculating device, the specifications thereof, and the type of the communication unit disposed therein. Hence, such factors need to be taken into consideration during the operation check. Thus, in the abovementioned method, the operator is forced to put in a lot of time and efforts. Meanwhile, in the abovementioned technology of conducting a test by connecting a pseudo-I/O device, the task of setting the operations of a switch needs to be accompanied by manually taking action on each operation of a calculating device.

SUMMARY

According to an aspect of the present invention, a switch device includes a memory unit for storing therein an error response for each error event to be sent in response at the time of a failure with respect to a control signal that controls a storage device connected to the switch device; an error response output unit for receiving input of the control signal and sequentially outputting each error response stored in the memory unit; an operation information computing unit for detecting an operation of a calculating device, which is connected to the switch device, corresponding to each error response output by the error response output unit and for obtaining, as operation information, a condition defining the operation of the calculating device upon receiving each error response; and an operation setting unit for setting operation condition at the time of a failure based on the operation information.

According to another aspect of the present invention, a switch control method implemented in a switch device includes storing an error response for each error event to be sent in response at the time of a failure with respect to a control signal that controls a storage device connected to the switch device; receiving input of the control signal and sequentially outputting each error response stored in the memory unit; detecting an operation of a calculating device, which is connected to the switch device, corresponding to each error response that has been output and obtaining, as operation information, a condition defining the operation of the calculating device upon receiving each error response; and, based on the operation information, setting operation condition at the time of a failure.

According to still another aspect of the present invention, a storage system includes a calculating device, a storage device, and a switch device. The calculating device performs data reading or data writing with respect to the storage device via the switch device. The switch device includes a memory unit for storing therein an error response for each error event to be sent in response at the time of a failure with respect to a control signal that controls the storage device connected to the switch device; an error response output unit for receiving input of the control signal and sequentially outputting each error response stored in the memory unit; an operation information computing unit for detecting an operation of the calculating device, which is connected to the switch device, corresponding to each error response output by the error response output unit and for obtaining, as operation information, a condition defining the operation of the calculating device upon receiving each error response; and an operation setting unit for setting operation condition at the time of a failure based on the operation information. The calculating device includes a control signal output unit for outputting the control signal to the switch device; and an error handling unit for receiving the error response from the switch device corresponding to the control signal output by the control signal output unit and for performing an operation to handle the error response.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 illustrates an example of a host behavior data table according to the second embodiment;

DESCRIPTION OF EMBODIMENTS

Preferred embodiments of the present invention will be explained with reference to accompanying drawings. The present invention is not limited to these embodiments.

[a] First Embodiment

Figure 1:
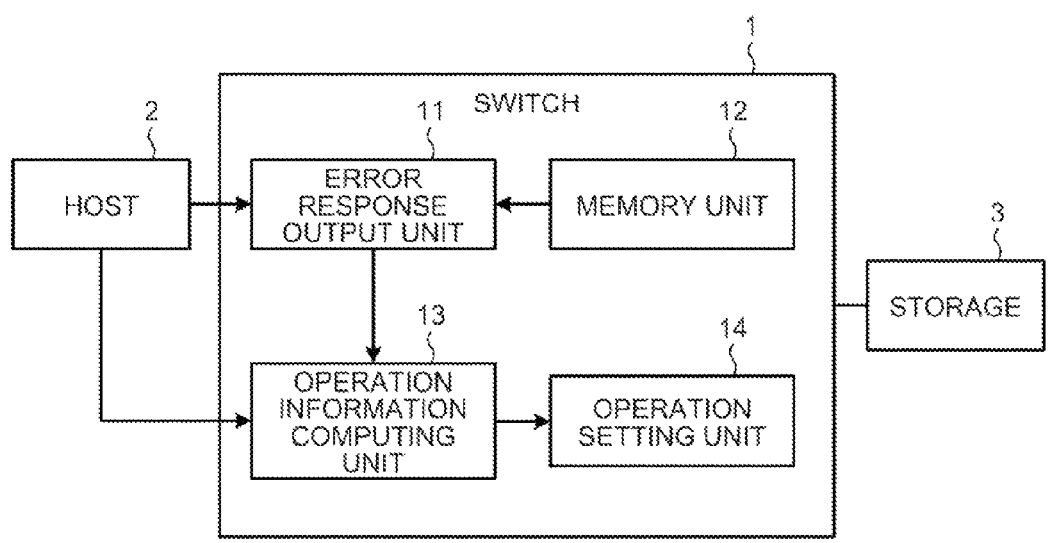
FIG. 1 is a block diagram of a functional configuration of a storage system including switches according to a first embodiment of the present invention.

FIG. 1 is a block diagram of a functional configuration of a storage system according to a first embodiment of the present invention.

Herein, a switch 1 is an exemplary switch device, a host 2 is an exemplary calculating device, and a storage 3 is an exemplary storage device. The switch 1 includes an error response output unit 11, a memory unit 12, an operation information computing unit 13, and an operation setting unit 14. In the following explanation, the host 2 outputs SCSI commands as control signals for controlling the storage 3. However, a control signal is not confined to an SCSI command.

The memory unit 12 is an information memory medium such as a memory or a hard disk drive (HDD) used for storing error responses. Herein, an error response represents the information that the storage 3 sends in response, at the time of a failure, to an SCSI command issued by the host 2 for the purpose of controlling the storage 3.

The error response output unit 11 receives SCSI commands from the host 2 and sequentially outputs the error responses that have been stored in the memory unit 12 to the host 2. Further, the error response output unit 11 receives SCSI commands from the host 2 and sequentially outputs the error responses that have been stored in the memory unit 12 to the host 2.

The operation information computing unit 13 detects the operations that the host 2 performs upon receiving an error response and then obtains operation information that includes the conditions defining those operations. The operation information computing unit 13 then outputs the operation information to the operation setting unit 14.

Based on the operation information, the operation setting unit 14 sets the operations to be performed by the switch 1 at the time of the failure.

Thus, in the first embodiment as described above, without having to depend on the operator to replace the firmware, the operations of an FC switch can be automatically set in synchronization with the operations performed by a host at the time of a failure.

[b] Second Embodiment

Figure 2:
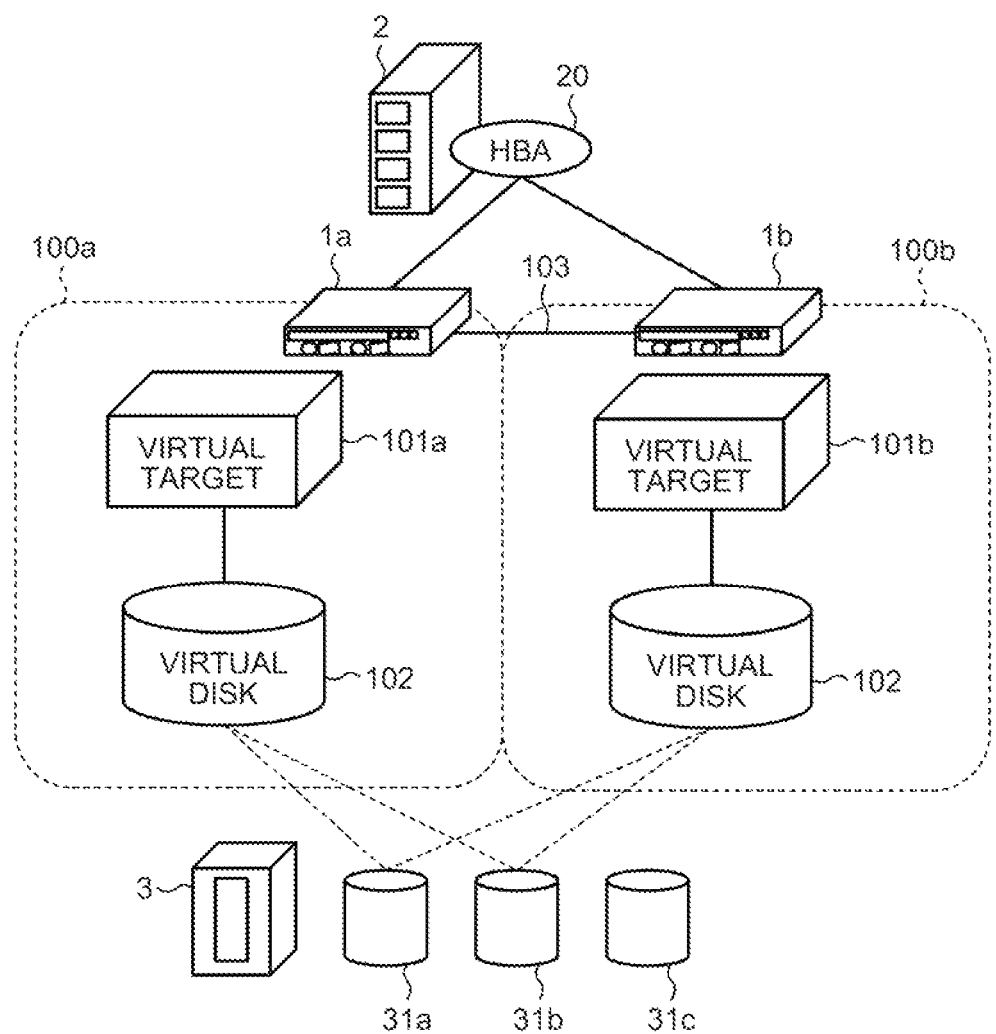
FIG. 2 is a schematic diagram of a configuration of a storage system including virtual FC switches according to a second embodiment of the present invention.
Figure 3:
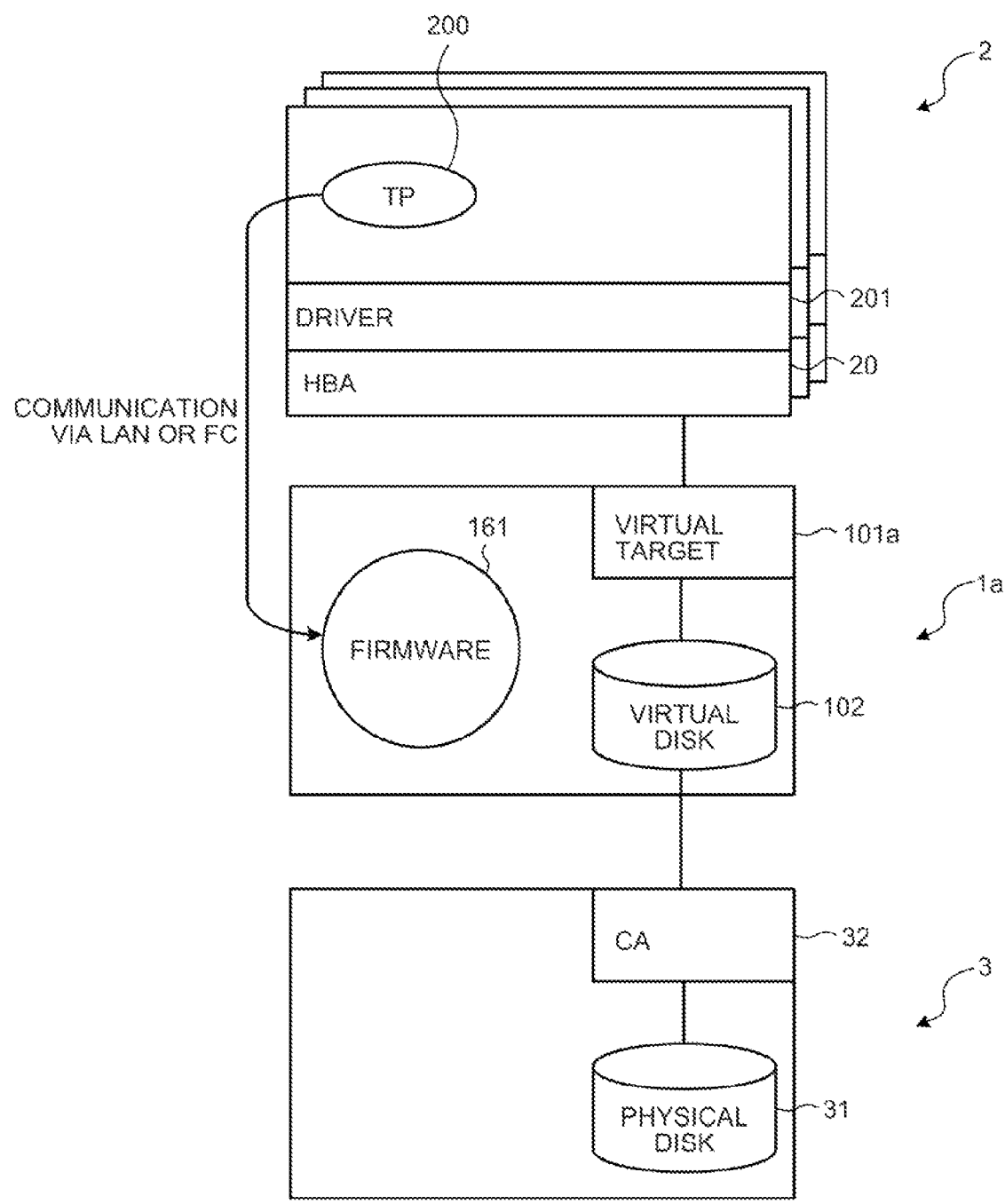
FIG. 3 is a connection diagram of connections between a host, a switch, and a storage according to the second embodiment.

Explained below with reference to FIGS. 2 and 3 is the outline of a configuration of a storage system according to a second embodiment of the present invention. FIG. 2 is a schematic diagram of a configuration of a storage system including virtual FC switches (i.e., virtual fibre channel switches) according to the second embodiment. FIG. 3 is a connection diagram of connections between a host, a switch, and a storage according to the second embodiment. In the present embodiment, the explanation is given about a configuration in which the host 2 functioning as a calculating device and the storage 3 functioning as a storage device perform optical data communication using a fibre channel. Hereinafter, the virtual FC switches are simply referred to as "FC switches".

An FC switch 1a and an FC switch 1b (when not distinguished, simply referred to as "FC switch 1") according to the present embodiment operate in two functioning modes, namely, an operational mode and a data collection mode. In the operational mode, the host 2 performs data reading or data writing with respect to the storage 3. Thus, the operational mode is implemented at the time of actually performing the operations. On the other hand, when a new host 2 is added and a connection between that host 2 and the storage 3 is newly established, the data collection mode is implemented in order to detect and collect the operations performed by that host 2 at the time of a failure and to accordingly set the operations performed by the FC switch 1. Herein, the "operations performed by the host 2" indicate issuing SCSI commands at the time of a failure or indicate the timings of issuing the SCSI commands. In the second embodiment, the host 2 outputs SCSI commands as control signals. However, a control signal is not confined to an SCSI command. Meanwhile, detecting the operations performed by the host 2 and collecting the information about those operations is called "data collection of the operations performed by the host 2". Herein, the term "collection" indicates that the operations performed by the host 2 are detected and the information on those operations is collected. In the data collection mode, the operation settings of the FC switch 1 are appropriately changed so that, in the operational mode, the FC switch 1 can perform appropriate operations with respect to each host 2. Explained below with reference to FIG. 2 are the operations of each device in the operational mode, which is the normal operating form.

Operational Mode

As illustrated in FIG. 2, the storage system according to the present embodiment includes the host 2, the FC switches 1a and 1b, and the storage 3. When the FC switch 1a is available for use, the host 2 performs data communication with the storage 3 via the FC switch 1a. In contrast, when the FC switch 1a is not available, the host 2 performs data communication with the storage 3 via the FC switch 1b.

The explanation on data communication between the host 2 and the storage 3 is given below in detail. Herein, the explanation is given for the case when the data communication is performed via the FC switch 1a. Since it is assumed that the FC switches 1a and 1b have the same configuration and perform identical operations during data communication, the following explanation is also applicable to the FC switch 1b.

In the host 2 is disposed a host bus adapter (HBA) 20, which is a communication unit for performing optical data communication with the storage 3 through a fibre channel. Thus, the host 2 makes use of the HBA 20 to perform optical data communication with the storage 3. In the storage 3 are installed physical disks 31a to 31c. Moreover, in practice, a channel adapter (CA) 32 illustrated in FIG. 3 is disposed as a communication port in the storage 3 for the purpose of transferring data to the physical disks during optical data communication. That is, in practice, the optical data communication is performed via the CA 32. However, for the ease of explanation, the CA 32 is not illustrated in FIG. 2. Moreover, for the sake of convenience in the following explanation, the fact that the data communication between the FC switch 1a and the storage 3 is performed via the CA 32 is not explicitly stated.

The FC switch 1a and the FC switch 1b respectively configure a virtual configuration 100a and a virtual configuration 100b. The virtual configuration 100a is meant to provide a virtual disk to the host 2, and includes a virtual target (VT) 101a and a virtual disk 102. The virtual configuration 100b includes a virtual target 101b and a virtual disk 102. The virtual target 101a functions as a virtual input-output port for performing data communication with the host 2. The virtual disk 102 represents a virtual memory medium configured using one or more of the physical disks 31a to 31c that are installed in the storage 3. In the present embodiment, it is assumed that the virtual disk 102 is configured using the physical disks 31a and 31b. However, there is no particular restriction on the number of physical disks used to configure a virtual disk. In FIG. 2, the virtual disk 102 is illustrated inside each of the virtual configuration 100a and the virtual configuration 100b. However, the virtual disk 102 in both configurations represents the same virtual disk and it only means that there are two different paths accessed by the host 2. That is, the host 2 is able to perform data communication with the virtual disk 102 via either the FC switch 1a or the FC switch 1b.

Herein, the host 2 makes use of the HBA 20 and establishes a connection with the virtual disk 102 via the virtual target 101a of the virtual configuration 100a. Once that connection is established, the host 2 sends a control signal to the FC switch 1a for the purpose of controlling data reading or data writing with respect to the virtual disk 102. In the present embodiment, each control signal is assumed to be an SCSI command, which is data represented by a code among codes from 0x00 to 0xff.

The connections between the devices are explained below with reference to FIG. 3. In FIG. 3, the fact that more than one host 2 is disposed is represented by a plurality of illustrations each representing a single host 2. That is, various types of the host 2 are connected to the FC switch 1a. In each host 2, a driver 201 is used to operate the corresponding HBA 20. The FC switch 1a receives commands such as data reading commands and data writing commands from each HBA 20. Then, the FC switch 1a performs data reading or data writing with respect to the virtual disk 102 via the virtual target 101a. At that time, between the FC switch 1a and the storage 3, reading or writing of the actual data is performed with respect to a physical disk 31 via the CA 32. For example, assume that one of the hosts 2 sends an SCSI command for reading to the FC switch 1a. In that case, the FC switch 1a controls the storage 3 according to the received SCSI command, reads the specified data from the virtual disk 102, and outputs that data to the host 2. Meanwhile, regarding a test program (TP) 200 illustrated in FIG. 3, the explanation is given later.

At the Time of Failure

Explained below are the operations during the operational mode when a failure occurs in the storage 3 or in the FC switch 1a.

When a failure occurs, the storage 3 outputs an error response to the FC switch 1a. Then, if appropriate, the FC switch 1a performs error response conversion according to the settings in firmware 161 and outputs the error response to the host 2, which performs operations corresponding to the error response according to a repeat count or a retry interval that have been set in advance. Herein, the repeat count is the number of times of outputting the same SCSI command before the host 2 determines that an error has occurred. The retry interval is the time interval between the issuance of a particular command by the host 2 and the issuance of the same command for the next time. In other words, the retry interval is the time interval during which the host 2 twice issues a particular command.

An error response is a response at the time of a failure from the storage 3 with respect to a control instruction from a storage control unit 19. In the present embodiment, an error response can be of various types such as an error sense that indicates the contents of the occurred error or an SCSI status that indicates the status of the storage 3. More particularly, an error sense is data represented by a code among codes from 0x1/0x00/0x00 to 0xf/0xff/0xff. Besides, with respect to each code, the type of the corresponding error sense is defined. Similarly, an SCSI status is data represented by a code among codes from 0x1 to 0xf. Besides, with respect to each code, the type of the corresponding SCSI status is defined.

Meanwhile, a condition in which there is no response from the storage 3 within a predetermined time period with respect to a control instruction from the storage control unit 19 is also considered to be a failure. This condition is referred to as a command timeout. In the following description, an "error response" may at times include a command timeout.

Herein, corresponding to an error response or a command timeout, each host 2 performs the operations regarding the repeat count or the retry interval in a different manner. Moreover, as described above, the operations performed by the FC switch 1a at the time of a failure are determined by the firmware 161. Hence, as described later, by appropriately altering the settings of the firmware 161 regarding the data collection mode, the FC switch 1a becomes able to perform appropriate operations with respect to each host 2.

Meanwhile, the FC switches 1a and 1b are communicably interconnected through a path 103. To the FC switch 1b, the FC switch 1a sends a heartbeat (a signal indicating that the FC switch 1a is in operation) via the path 103. If the FC switch 1b stops receiving the heartbeat from the FC switch 1a, then the FC switch 1b determines that a local area network (LAN) failure has occurred at the FC switch 1a and makes changes so that the data communication between the host 2 and the storage 3 is performed via the FC switch 1b. This function is called "path switching". Such path switching is also performed when communication between the FC switch 1a and the host 2 gets disconnected or when the network connection between the FC switches 1a and 1b that has been established via a hub gets disconnected.

Data Collection Mode

The data collection mode is the mode for automatically updating the settings of the firmware 161 executed by the FC switch 1a in such a way that the FC switch 1a can take appropriate responses to the operations that are performed by the host 2 when it receives an error response from the FC switch 1a or when a command timeout occurs. As the brief summary of the operations performed in the data collection mode, the FC switch 1a receives an error response from the storage 3 or receives a command timeout and collects information regarding the operations that the host 2 performs with respect to the storage 3. Based on the collected information, the FC switch 1a changes the settings of the firmware 161 executed therein. Following is the detailed description of the data collection mode. Herein, regarding the communication performed at the time of collecting data of the operations performed by the host 2 with respect to an error response or a command timeout in the data collection mode, the actual communication is performed between the TP 200 executed in the host 2 and the firmware 161 executed by the FC switch 1a as illustrated in FIG. 3. However, for the sake of convenience in the following explanation, it is assumed that the host 2 and the FC switch 1a directly communicate with each other.

The overall configuration of the storage system according to the present embodiment is explained with reference to FIG. 4. Herein, FIG. 4 is a block diagram for explaining the functions of the storage system including the FC switches according to the second embodiment.

Figure 4:
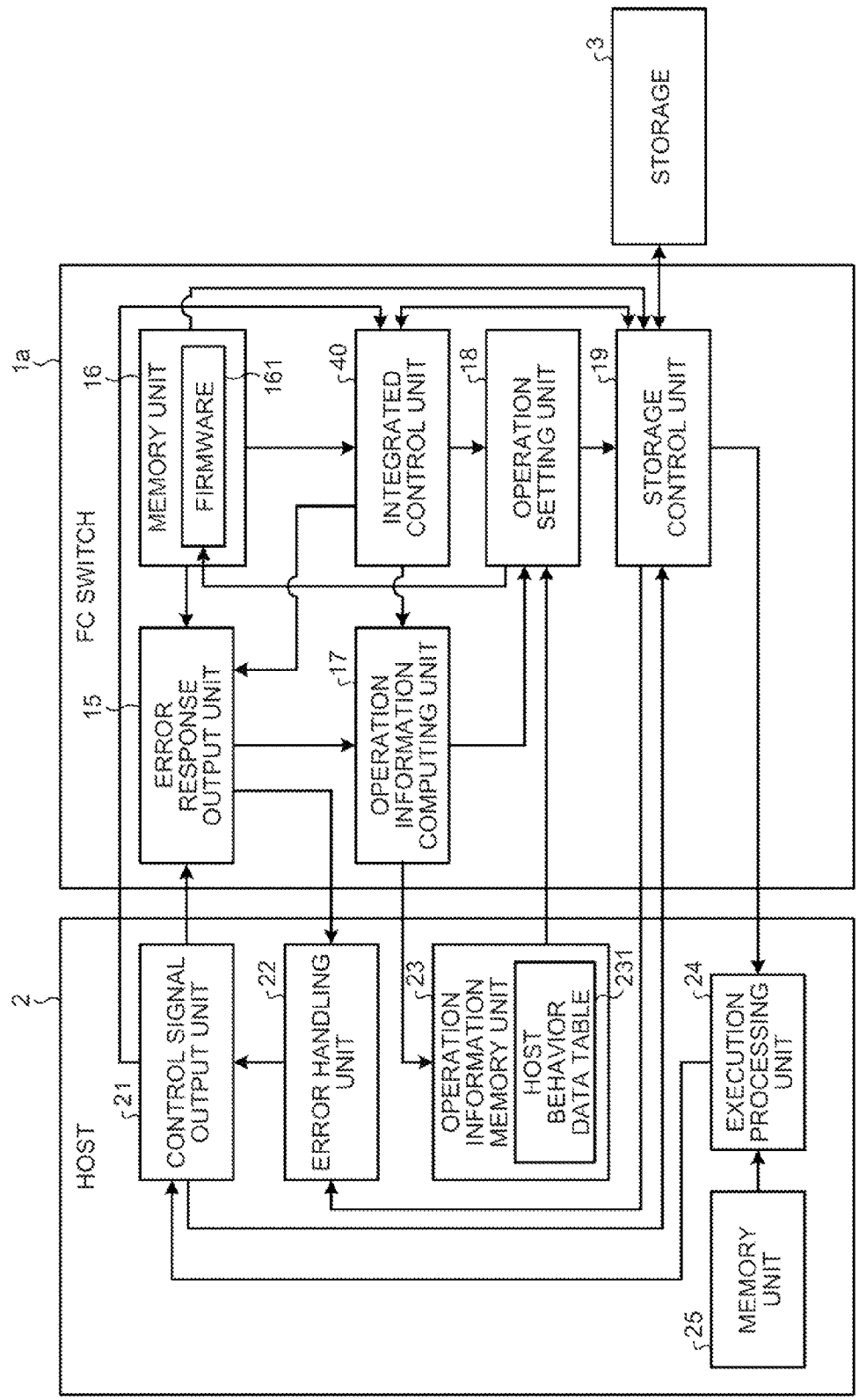
FIG. 4 is a block diagram for explaining the functions of the storage system including the FC switches according to the second embodiment.

As illustrated in FIG. 4, the FC switch 1a includes an error response output unit 15, a memory unit 16, an operation information computing unit 17, an operation setting unit 18, a storage control unit 19, and an integrated control unit 40. The host 2 includes a control signal output unit 21, an error handling unit 22, an operation information memory unit 23, an execution processing unit 24, and a memory unit 25. From among those functional units, the error response output unit 15, the operation information computing unit 17, the operation setting unit 18, and the operation information memory unit 23 operate in the data collection mode.

In the data collection mode, the error response output unit 15 receives an SCSI command from the control signal output unit 21. The SCSI command is, for example, a read command or a write command. Subsequently, the error response output unit 15 informs the operation information computing unit 17 that an SCSI command has been received, and then retrieves a particular error response specified by the integrated control unit 40 and outputs that error response to the error handling unit 22 and to the operation information computing unit 17. Besides, while collecting information about the operations performed by the host 2 at the time of a command timeout, the error response output unit 15 destroys any SCSI command that has been received from the control signal output unit 21. Subsequently, when the integrated control unit 40 issues an instruction for terminating the operation of collecting data of the operations performed by the host 2, the error response output unit 15 stops the operation of outputting the error response or destroying the SCSI command, and informs the operation information computing unit 17 that the operation of collecting data of the operations performed by the host 2 has been terminated. Meanwhile, alternatively, the integrated control unit 40 can issue the same instruction for terminating the data collection operation to the operation information computing unit 17.

The memory unit 16 includes an information memory medium such as a memory or a hard disk drive. In the memory unit 16 is stored the firmware 161, which is the software program for controlling the operations performed by the FC switch 1a. The firmware 161 includes various settings such as a SCSI-command-timeout monitoring time, a path switching monitoring time during LAN failure, and conversion information of error sense contents. The SCSI-command-timeout monitoring time indicates the time taken by the FC switch 1a to determine that the storage 3 cannot process an SCSI command that has been received from the host 2. The path switching monitoring time during LAN failure is the time taken by the FC switch 1a during a LAN failure to determine the occurrence of path switching after an SCSI command is received from the host 2. The conversion information of error sense contents is the information regarding converting a received SCSI command into another SCSI command. Meanwhile, the memory unit 16 also stores therein the error responses.

The operation information computing unit 17 includes a counter and a timer. In the data collection mode, upon receiving a notification from the error response output unit 15 about the reception of an SCSI command, the operation information computing unit 17 increments the counter thereof and keeps count of the number of times each type of SCSI command is input. Moreover, with the use of the timer, the operation information computing unit 17 measures the time period between the timing of receiving a notification from the error response output unit 15 about the reception of an SCSI command and the timing at which a specified error response is input. In the case of a command timeout, the operation information computing unit 17 measures the time period between the timing of receiving a notification from the error response output unit 15 about the reception of an SCSI command and the timing of receiving a notification from the error response output unit 15 about the reception of the subsequent SCSI command.

Upon receiving a notification from the error response output unit 15 about the reception of an instruction for terminating the operation of collecting data of the operations performed by the host 2, the operation information computing unit 17 obtains the number of times each type of SCSI command is input, and obtains the retry count of the error response or the command timeout corresponding to each SCSI command. Moreover, the operation information computing unit 17 sets the measured time period as the retry interval of the error response or the command timeout corresponding to each SCSI command. Herein, the measured time period indicates the time period between the timing of receiving a notification from the error response output unit 15 about the reception of an SCSI command and the timing at which the specified error response is input. In the case of a command timeout, the operation information computing unit 17 measures the time period between the timing of receiving a notification from the error response output unit 15 about the reception of an SCSI command and the timing of receiving a notification from the error response output unit 15 about the reception of the subsequent SCSI command.

This retry count and the retry interval represent the "operation information" of the host 2. The operation of obtaining the operation information from the operations performed by the host 2 is called "collection of operation information".

The operation information computing unit 17 outputs, to the operation information memory unit 23 of the host 2, the retry count and the retry interval obtained as described above as well as outputs the corresponding SCSI commands and the information on the error responses or the command timeouts. Then, the operation information computing unit 17 ensures that the operation information of the host 2 is registered in a host behavior data table 231. If a large number of hosts 2 are present, then the FC switch needs to have a large memory capacity for the purpose of collectively storing the host behavior data table 231 corresponding to each host 2. Thus, in the present embodiment, in order to keep the memory capacity of the FC switch 1*a* under control, each host 2 is configured to store therein the host behavior data table 231 that includes the operation information of that particular host 2. However, if the FC switch 1*a* has a sufficient memory capacity, then the host behavior data tables 231 can be stored therein.

In the present embodiment, only after the data collection is complete regarding the operations performed by the host 2 corresponding to all error responses with respect to a single SCSI command or corresponding to a command timeout, the information regarding the retry count and the retry interval is output. However, alternatively, the operation information computing unit 17 can also be configured to output the information regarding the retry count and the retry interval after the data collection is complete regarding the operations performed by the host 2 corresponding to all SCSI commands or corresponding to a command timeout.

Moreover, the operation information computing unit 17 receives, from the integrated control unit 40, an instruction for terminating the operation of collecting data of the operations performed by the host 2. Then, once the operation information is collected regarding the operations performed by the host 2 prior to the reception of the instruction for terminating the data collection operation, the operation information computing unit 17 notifies the operation setting unit 18 that the operation of collecting operation information has been terminated.

In the data collection mode, the operation setting unit 18 receives a notification from the operation information computing unit 17 about the termination of the operation of collecting operation information. Then, the operation setting unit 18 obtains the host behavior data table 231 from the operation information memory unit 23 of the host 2 and, using the information registered in the host behavior data table 231, updates the firmware 161 for the purpose of setting the operations performed by the FC switch 1*a* at the time of a failure. More particularly, updating the firmware 161 includes updating the settings of SCSI-command-timeout monitoring time, the path switching monitoring time during LAN failure, and the conversion information of error sense contents.

In the operational mode, the storage control unit 19 receives an SCSI command from the control signal output unit 21 and controls that storage 3 as instructed in the SCSI command. Moreover, the storage control unit 19 receives a response from the storage 3 and outputs that response to the execution processing unit 24 of the host 2. For example, in the case of receiving an SCSI command for reading predetermined data, the storage control unit 19 controls the storage 3 for the purpose of providing the specified data and outputs that data to the execution processing unit 24 of the host 2. Herein, the storage control unit 19 is explained to execute commands simply with respect to the storage 3. However, in practice, reading or writing is performed with respect to the physical disk 31.

In the case when a failure occurs in the storage 3 in the operational mode, the storage control unit 19 receives an error response from the storage 3. Upon receiving the error response, the storage control unit 19 refers to the firmware 161 and, if appropriate, creates error information to be output to the host 2 by converting the received error response using conversion information. Then, the storage control unit 19 adjusts the output timing according to each monitoring time and outputs the error information to the error handling unit 22 of the host 2.

The integrated control unit 40 performs the integrated control of the operations performed by the FC switch 1*a* that include adjusting the operation timing of each constituent element of the FC switch 1*a*. The solid arrows from the integrated control unit 40 toward the constituent elements indicate the flow of control instructions.

In the data collection mode, the integrated control unit 40 receives an instruction for continuously outputting a particular error response (an instruction "keep outputting a particular error response") from the control signal output unit 21 and accordingly controls the error response output unit 15 for the purpose of outputting only the specified error response. Moreover, the integrated control unit 40 receives a command timeout instruction from the control signal output unit 21 and accordingly controls the error response output unit 15 to not output error responses. Furthermore, upon receiving an instruction from the control signal output unit 21 for terminating the operation of collecting data of the operations performed by the host 2, the integrated control unit 40 controls the error response output unit 15 for the purpose of not outputting error responses. In the present embodiment, once the operation setting unit 18 stops operating, the integrated control unit 40 notifies all constituent elements about the termination of the data collection operation.

The control signal output unit 21 includes a memory medium such as a memory, and stores in advance the control signals to be used to control the storage 3 in the memory area thereof. In the present embodiment, the control signal output unit 21 stores SCSI commands (0x00 to 0xff) as the control signals.

In the operational mode, the control signal output unit 21 receives a request from the execution processing unit 24 and accordingly outputs, to the storage control unit 19 of the FC switch 1*a*, a control signal for the purpose of performing the requested control (such as data reading or data writing) with respect to the storage 3. As described above, in the present embodiment, the control signal is an SCSI command.

In the data collection mode, the control signal output unit 21 receives a request from the execution processing unit 24 and instructs the integrated control unit 40 of the FC switch 1*a* to switch to the data collection mode. Moreover, the control signal output unit 21 specifies an error response to be output to the integrated control unit 40 or instructs the integrated control unit 40 to execute a command timeout. More particularly, in the present embodiment, in order to instruct the integrated control unit 40 to switch to the data collection mode, and in order to specify an error response to the integrated control unit 40 or to instruct the integrated control unit 40 to execute a command timeout; the control signal output unit 21 sends to the integrated control unit 40 an instruction for continuously outputting a particular error response. The notification of the instruction for switching to the data collection mode or the notification of a particular error response is sent using a particular unused SCSI command.

Then, until the error handling unit 22 finishes the operation of error handling with respect to a single SCSI command, the control signal output unit 21 keeps outputting that single SCSI command to the error response output unit 15. Once the operation of error handling is complete, the control signal output unit 21 receives a notification of error handling completion and outputs one of the other SCSI commands with respect to which the data collection of the operations performed by the host 2 is yet to be carried out. In this way, with respect to each SCSI command, the control signal output unit 21 makes the FC switch 1*a* perform data collection of the operations performed by the host 2. In the present embodiment, with respect to a single error response, data collection of the operations performed by the host 2 is firstly carried out with respect to the SCSI command represented by 0x00. Then, data collection is carried out by sequentially changing the SCSI command to the SCSI command represented by 0x01, the SCSI command represented by 0x02, and so on up to the SCSI command represented by 0xff.

Once data collection of the operations performed by the host 2 is complete with respect to the error response or the command timeout specified at the execution processing unit 24, the control signal output unit 21 notifies the execution processing unit 24 that data collection of the operations performed by the host 2 is complete. Herein, completion of data collection of the operations with respect to a specified error response means that the data of the operations performed by the host 2 with respect to that specified error response has been collected for each of the stored SCSI commands. Upon completion of data collection of the operations performed by the host 2 with respect to the specified error response, the control signal output unit 21 sends, to the integrated control unit 40 of the FC switch 1*a*, a data-collection-mode ending notification that also includes the notification that data collection of the operations performed by the host 2 is complete. The data-collection-mode ending notification is sent using a particular unused SCSI command.

The error handling unit 22 includes a memory medium such as a memory, and stores in advance the retry interval and the repeat count corresponding to each error response and the command timeout in the memory area thereof. Besides, the error handling unit 22 includes a counter and a timer.

When a failure occurs in the operational mode, the error handling unit 22 receives input of error responses from the storage control unit 19. Every time an error response is input, the error handling unit 22 increments the counter thereof for keeping an input count indicating the number of times the error responses are input. If the input count is equal to or smaller than the repeat count; then, after the retry interval for the input error response has elapsed, the error handling unit 22 instructs the control signal output unit 21 to output a control signal. On the other hand, when the input count exceeds the repeat count, the error handling unit 22 notifies the control signal output unit 21 that the operation of error handling is complete.

In the case of a command timeout, when no error response is received within a predetermined time period, the error handling unit 22 increments the counter thereof for keeping an input count of error responses. If the input count is equal to or smaller than the repeat count; then, after the retry interval for the command timeout has elapsed, the error handling unit 22 instructs the control signal output unit 21 to output a control signal. On the other hand, when the input count exceeds the repeat count, the error handling unit 22 notifies the control signal output unit 21 that the operation of error handling is complete.

In the data collection mode, the error handling unit 22 receives input of error responses from the error response output unit 15. Every time an error response is received, the error handling unit 22 increments the counter thereof for keeping the input count of error responses. If the input count is equal to or smaller than the repeat count; then the error handling unit 22 makes use of the timer thereof and waits for the retry interval with respect to the input error response to elapse. Once that retry interval has elapsed, the error handling unit 22 instructs the control signal output unit 21 to output a control signal. On the other hand, when the input count exceeds the repeat count, the error handling unit 22 notifies the control signal output unit 21 that the operation of error handling is complete.

If no error response is received from the error response output unit 15 within a predetermined time period, then the error handling unit 22 determines that a command timeout has occurred and increments the counter thereof for keeping the input count of error responses. If the input count is equal to or smaller than the repeat count; then the error handling unit 22 makes use of the timer thereof and waits for the retry interval with respect to the command timeout to elapse. Once the retry interval has elapsed, the error handling unit 22 instructs the control signal output unit 21 to output a control signal. Herein, if the retry interval is identical to the predetermined interval used in determining the command timeout; then, immediately after the retry interval has elapsed, the error handling unit 22 instructs the control signal output unit 21 to output a control signal. On the other hand, when the input count exceeds the repeat count, the error handling unit 22 notifies the control signal output unit 21 that the operation of error handling is complete.

The operation information memory unit 23 is an information memory medium such as a memory or a hard disk drive. Explained below with reference to FIG. 5 is the host behavior data table 231 stored in the operation information memory unit 23. Thus, FIG. 5 illustrates an example of the host behavior data table 231. The operation information memory unit 23 stores therein, in advance, the format of the host behavior data table 231 as illustrated in FIG. 5. Besides, from the operation information computing unit 17 of the FC switch 1*a* described later, the operation information memory unit 23 receives information regarding the retry count and the retry interval corresponding to the combination of a particular SCSI command and an error response. Moreover, from the operation information computing unit 17, the operation information memory unit 23 receives information regarding the retry count and the retry interval corresponding to the command timeout of a particular SCSI command. Then, in the host behavior data table 231, the operation information memory unit 23 stores the retry counts and the retry intervals in a corresponding manner to the SCSI commands and the errors registered.

The memory unit 25 is an information memory medium such as a memory or a hard disk drive that is used for storing an application for performing data reading or data writing with respect to the storage 3.

Moreover, in the memory unit 25 is stored in advance the TP 200 illustrated in FIG. 3. The TP 200 instructs the firmware 161, which is executed by the FC switch 1a, to execute the operation of collecting operation information regarding operations performed by the host 2 with respect to error responses and command timeouts.

In the operational mode, the execution processing unit 24 executes the application stored in the memory unit 25. When the execution of that application requires data communication with the storage 3, the execution processing unit 24 requests the control signal output unit 21 to output a control signal for performing communication of the desired data. Then, the execution processing unit 24 receives a response containing the requested data from the storage control unit 19 of the FC switch 1a.

In the data collection mode, the execution processing unit 24 executes the TP 200 illustrated in FIG. 3. Upon executing the TP 200, the execution processing unit 24 instructs the control signal output unit 21 to output an instruction for switching to the data collection mode to the FC switch 1a. Moreover, the execution processing unit 24 instructs the control signal output unit 21 to output a control signal that specifies an error response to be responded by the FC switch 1a or a control signal that instructs the FC switch 1a to execute a command timeout. Subsequently, in the case of receiving an error response, the execution processing unit 24 receives from the control signal output unit 21 a notification that data collection of the operations performed by the host 2 with respect to that error response is complete for all SCSI commands. Then, the execution processing unit 24 instructs the control signal output unit 21 to specify another error response with respect to which data collection of the operations performed by the host 2 is not yet done. In this way, the execution processing unit 24 sequentially changes the error response with respect to which data collection of the operations performed by the host 2 is to be carried out and makes the FC switch 1a perform data collection of the operations performed by the host 2 with respect to all error responses. Similarly, in the case of a command timeout, the execution processing unit 24 makes the FC switch 1a perform data collection of the operations performed by the host 2 for all SCSI commands. In the present embodiment, as data collection of the operations performed by the host 2 with respect to an error response; data collection of the operations performed by the host 2 in each error sense, in each SCSI state, and in the command timeout is carried out for each SCSI command.

Collection of Operation Information

Figure 6:
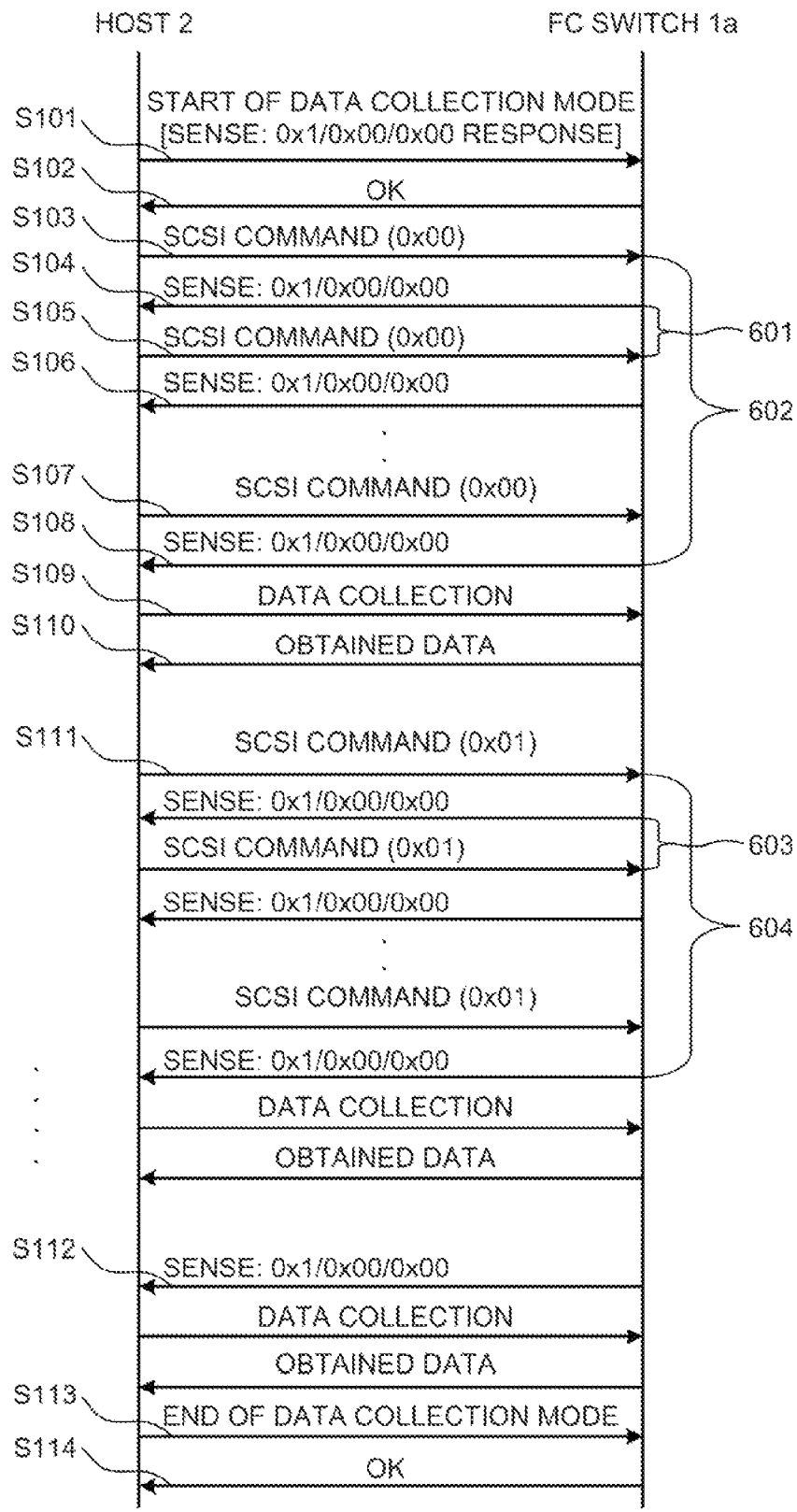
FIG. 6 is a sequence diagram for explaining data collection using an error sense according to the second embodiment.
Figure 7:
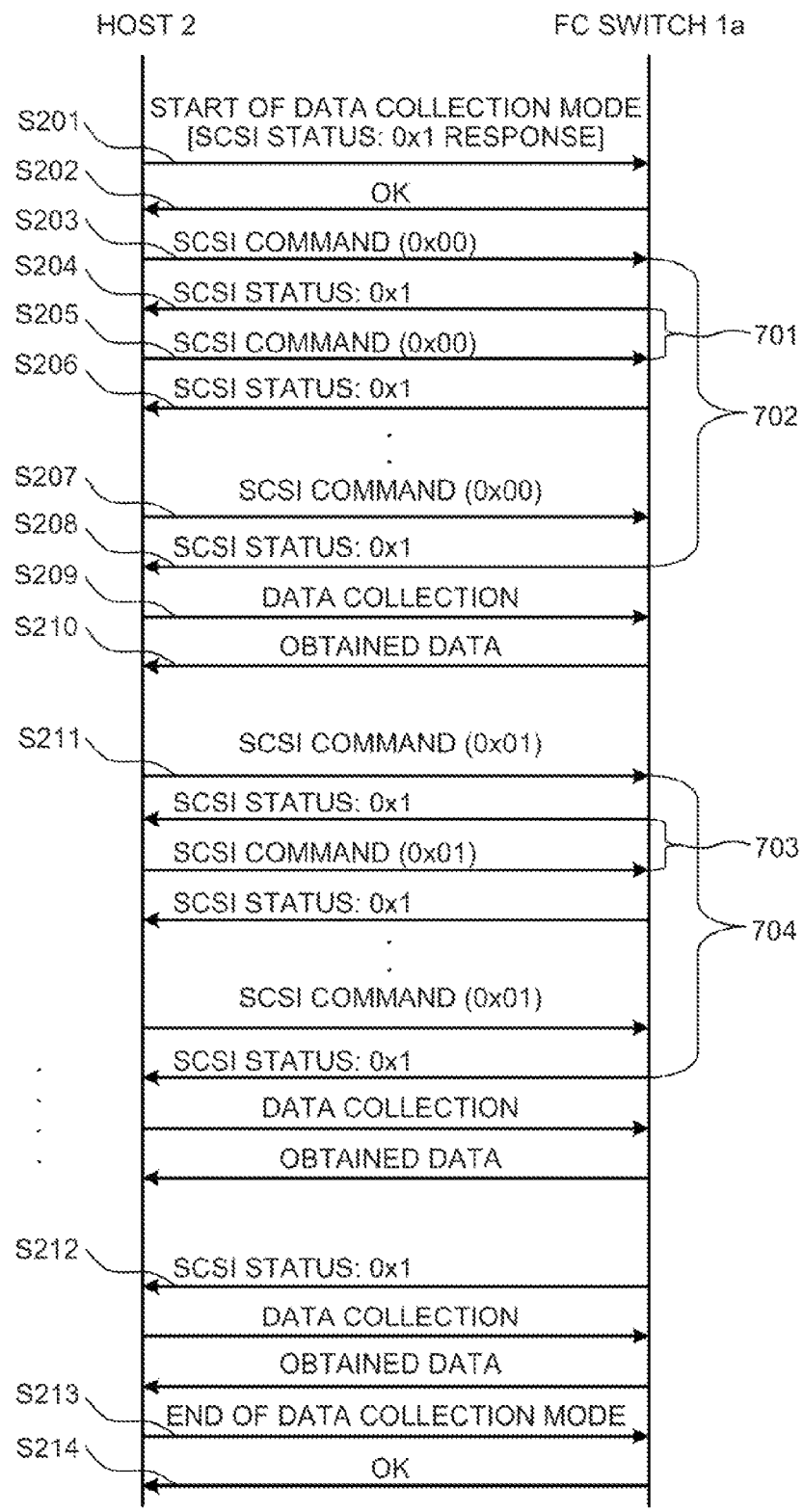
FIG. 7 is a sequence diagram for explaining data collection using an SCSI status according to the second embodiment.
Figure 8:
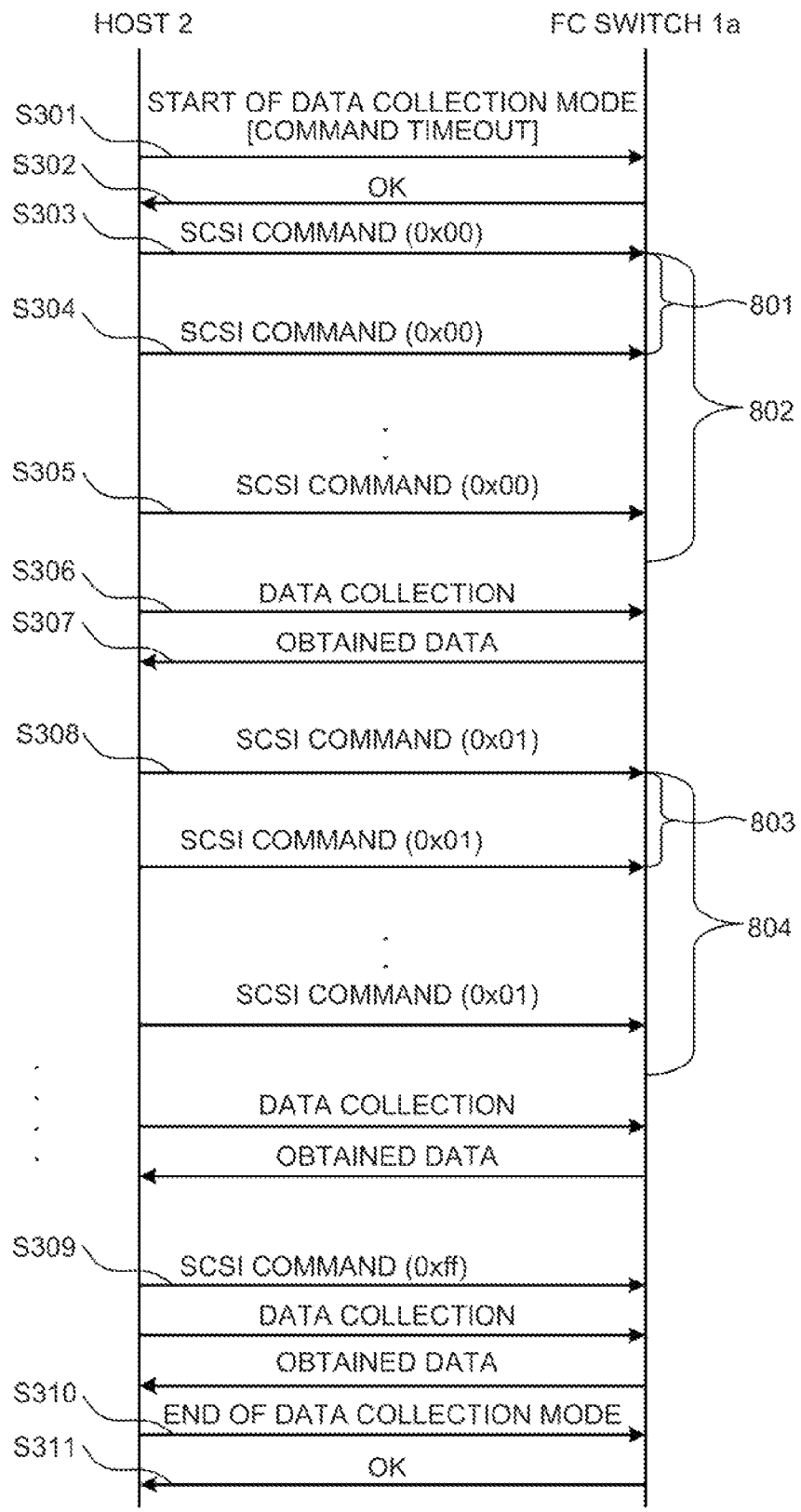
FIG. 8 is a sequence diagram for explaining data collection of the operation information using a command timeout according to the second embodiment.

Given below with reference to FIGS. 6 to 8 is the explanation regarding collection of the operation information of the host 2 for each error response. FIG. 6 is a sequence diagram for explaining collection of the operation information using an error sense; FIG. 7 is a sequence diagram for explaining collection of the operation information using an SCSI status; and FIG. 8 is a sequence diagram for explaining collection of the operation information using a command timeout. In each of FIGS. 6 to 8, the longitudinal axis on the left side represents the temporal operations performed by the host 2 and the longitudinal axis on the right side represents the temporal operations performed by the FC switch 1a. In both longitudinal axes, the time is assumed to advance in the downward direction.

Firstly, with reference to FIG. 6, the explanation is given about collection of the operation information using an error sense. The control signal output unit 21 sends, to the integrated control unit 40, an instruction to start the data collection mode along with the specification of 0x1/0x00/0x00 as the error sense to be responded (S101). In response, the integrated control unit 40 sends a signal indicating that the instruction is received (S102). Then, the control signal output unit 21 sends the SCSI command represented by 0x00 to the error response output unit 15 (S103). In response, the error response output unit 15 sends the error sense represented by 0x1/0x00/0x00 (S104). The control signal output unit 21 receives that error sense and, after a predetermined retry interval elapses, resends the SCSI command represented by 0x00 (S105). In response, the error response output unit 15 sends the error sense represented by 0x1/0x00/0x00 (S106). The control signal output unit 21 repeats such data communication for a predetermined repeat count before sending the SCSI command represented by 0x00 for the last time of the retry count (S107). In response, the error response output unit 15 sends the error sense represented by 0x1/0x00/0x00 (S108). During that time period, the operation information computing unit 17 obtains an interval 601 as the retry interval and obtains the number of times the SCSI command represented by 0x00 is repeatedly received during an interval 602 as the retry count. To the operation information computing unit 17, the control signal output unit 21 then sends a request for giving the operation information data (hereinafter, referred to as "data collection request") (S109). Herein, as described above, the data collection request issued by the control signal output unit 21 is in practice issued by notifying the integrated control unit 40 that the data collection of operations is complete. Upon receiving that request, the operation information computing unit 17 stores, in the operation information memory unit 23, the retry interval and the retry count in a corresponding manner with the SCSI command represented by 0x00 and the error sense represented by 0x1/0x00/0x00 (S110).

Subsequently, data collection of the operations performed by the host 2 for the SCSI command represented by 0x01 starts in an identical manner (S111). At that time, in an identical manner to the case of the code 0x00, the operation information computing unit 17 obtains an interval 603 as the retry interval of the SCSI command represented by 0x01 and obtains the number of times the SCSI command represented by 0x01 is repeatedly received during an interval 604 as the retry count. In this way, collection of the operation information regarding the operations performed by the host 2 is sequentially repeated for each SCSI command up to the SCSI command represented by 0xff. The control signal output unit 21 sends the last of the error senses represented by 0x1/0x00/0x00 to the SCSI command represented by 0xff (S112).

Once data collection of the operations is complete for the SCSI command represented by 0xff, the execution processing unit 24 sends a data-collection-mode ending instruction to the integrated control unit 40 (S113) and the integrated control unit 40 acknowledges with a signal indicating that the instruction is received (S114).

The explanation given above is about collecting the operation information using the error sense represented by 0x1/0x00/0x00. The same sequence of operations is repeated using each of the error senses represented by 0x1/0x00/0x00 to 0xf/0xff/0xff. As a result, it becomes possible to collect the operation information such as the retry interval and the retry count of the host 2 from the responses of all error senses corresponding to all SCSI commands.

The explanation about collection of the operation information using an SCSI status is given with reference to FIG. 7. The control signal output unit 21 sends, to the integrated control unit 40, an instruction to start the data collection mode along with the specification of 0x1 as the SCSI state to be responded (S201). In response, the integrated control unit 40 sends a signal indicating that the instruction is received (S202). Then, the control signal output unit 21 sends the SCSI command represented by 0x00 to the error response output unit 15 (S203). In response, the error response output unit 15 sends the SCSI status represented by 0x1 (S204). The control signal output unit 21 receives that SCSI status and, after a predetermined retry interval elapses, resends the SCSI command represented by 0x00 (S205). In response, the error response output unit 15 sends the SCSI status represented by 0x1 (S206). The control signal output unit 21 repeats such data communication for a predetermined repeat count before sending the SCSI command represented by 0x00 for the last time of the retry count (S207). In response, the error response output unit 15 sends the SCSI status represented by 0x1 (S208). During that time period, the operation information computing unit 17 obtains an interval 701 as the retry interval and obtains the number of times the SCSI command represented by 0x00 is repeatedly received during an interval 702 as the retry count. To the operation information computing unit 17, the control signal output unit 21 then sends a data collection request (S209). Upon receiving that request, the operation information computing unit 17 stores, in the operation information memory unit 23, the retry interval and the retry count in a corresponding manner with the SCSI command represented by 0x00 and the SCSI status represented by 0x1 (S210).

Subsequently, data collection of the operations performed by the host 2 for the SCSI command represented by 0x01 starts in an identical manner (S211). At that time, in an identical manner to the case of the code 0x00, the operation information computing unit 17 obtains an interval 703 as the retry interval of the SCSI command represented by 0x01 and obtains the number of times the SCSI command represented by 0x01 is repeatedly received during an interval 704 as the retry count. In this way, collection of the operation information regarding the operations performed by the host 2 is sequentially repeated for each SCSI command up to the SCSI command represented by 0xff. The control signal output unit 21 sends the last of the SCSI statuses represented by 0x1 to the SCSI command represented by 0xff (S212).

Once data collection of the operations is complete for the SCSI command represented by 0xff, the execution processing unit 24 sends a data-collection-mode ending instruction to the integrated control unit 40 (S213) and the integrated control unit 40 acknowledges with a signal indicating that the instruction is received (S214).

The explanation given above is about collecting the operation information using the SCSI status represented by 0x1. The same sequence of operations is repeated using each of the SCSI statuses represented by 0x1 to 0xf. As a result, it becomes possible to collect the operation information such as the retry interval and the retry count of the host 2 from the responses of all SCSI statuses corresponding to all SCSI commands.

The explanation about collection of the operation information using a command timeout is given with reference to FIG. 8. The control signal output unit 21 sends, to the integrated control unit 40, an instruction to start the data collection mode along with the specification of a command timeout as the error response (S301). In response, the integrated control unit 40 sends a signal indicating that the instruction is received (S302). Then, the control signal output unit 21 sends the SCSI command represented by 0x00 to the error response output unit 15 (S303). However, the error response output unit 15 sends no response to the SCSI command represented by 0x00. Consequently, after a predetermined command timeout period elapses, the control signal output unit 21 resends the SCSI command represented by 0x00 (S304). However, the error response output unit 15 sends no response. Still, the control signal output unit 21 repeats such data communication for a predetermined repeat count before sending the SCSI command represented by 0x00 for the last time of the retry count (S305). During that time period, the operation information computing unit 17 obtains an interval 801 as the command timeout period and obtains the number of times the SCSI command represented by 0x00 is repeatedly received during an interval 802 as the retry count. To the operation information computing unit 17, the control signal output unit 21 then sends a data collection request (S306). This data collection request is a request demanded by the FC switch 1a for getting the data sent from the FC switch 1a in order to temporarily store the command time period and the retry count in the host 2. Upon receiving that request, the operation information computing unit 17 stores, in the operation information memory unit 23, the retry interval and the retry count in a corresponding manner with the SCSI command represented by 0x00 (S307).

Subsequently, data collection of the operations performed by the host 2 for the SCSI command represented by 0x01 starts in an identical manner (S308). At that time, in an identical manner to the case of 0x00, the operation information computing unit 17 obtains an interval 803 as the retry interval of the SCSI command represented by 0x01 and obtains the number of times the SCSI command represented by 0x01 is repeatedly received during an interval 804 as the retry count. In this way, collection of the operation information regarding the operations performed by the host 2 is sequentially repeated for each SCSI command up to the SCSI command represented by 0xff. The control signal output unit 21 sends the SCSI command represented by 0xff (S309).

Once data collection of the operations is complete for the SCSI command represented by 0xff, the execution processing unit 24 sends a data-collection-mode ending instruction to the integrated control unit 40 (S310) and the integrated control unit 40 acknowledges with a signal indicating that the instruction is received (S311).

As a result, for the purpose of temporary storage, the host 2 is able to collect the information regarding the command timeout period and the retry count of the host 2 during the command timeouts corresponding to all SCSI commands.

Changes in Firmware Settings

Figure 9:
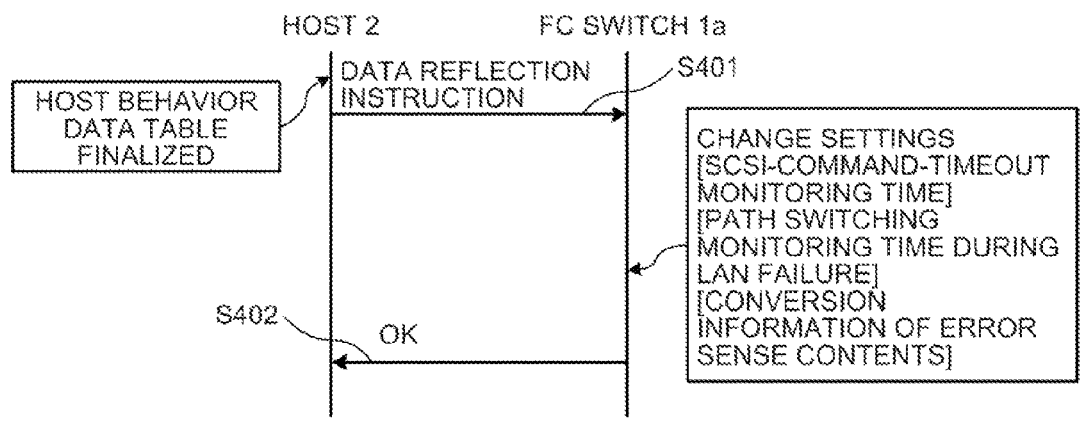
FIG. 9 is a sequence diagram for explaining the operation of changing firmware settings according to the second embodiment.

Explained below with reference to FIG. 9 are the changes made in the settings of the firmware 161. FIG. 9 is a sequence diagram for explaining the operation of changing the settings of the firmware 161.

Once the host behavior data table 231 is finalized, the execution processing unit 24 sends a data reflection instruction to the operation setting unit 18 (S401). Thus, prior to the timing of performing Step S401, it is assumed that the host behavior data table 231 is registered with the operation information regarding the retry interval and the retry count of the host 2 in each error response corresponding to all SCSI commands.

Based on the host behavior data table 231 stored in the operation information memory unit 23, the operation setting unit 18 updates the settings in the firmware 161 such as the SCSI-command-timeout monitoring time, the path switching monitoring time during LAN failure, and the conversion information of error sense contents. Then, the operation setting unit 18 notifies the execution processing unit 24 that the settings of the firmware 161 have been updated (S402). Thus, the firmware 161 gets updated in between Steps S401 and S402.

The changes performed by the operation setting unit 18 in each type of setting of the firmware 161 are described below in detail.

Firstly, the setting regarding the SCSI-command-timeout monitoring time is explained. The operation setting unit 18 extracts the command timeout period for each SCSI command from the host behavior data table 231. The command timeout period is a type of the retry interval. More particularly, the command timeout period is the time period taken to resend a particular SCSI command after it is determined that there has been no response to the same SCSI command sent previously. Subsequently, the operation setting unit 18 obtains the minimum value of the command timeout period from among all command timeout periods and then obtains a value by subtracting a margin period (assumed to be five seconds in the second embodiment) from the minimum value of the command timeout period. Herein, the margin period is kept to ensure that the FC switch 1*a* is able to finish the appropriate completion operations before the command timeout occurs. That is, in the second embodiment, the FC switch 1*a* is configured to finish the appropriate completion operations in five seconds. Meanwhile, the margin period is stored in advance in the operation setting unit 18.

If the obtained value is smaller than a reference value (assumed to be five seconds in the second embodiment) of the SCSI-command-timeout monitoring time, then the operation setting unit 18 sets the obtained value as the SCSI-command-timeout monitoring time for the host 2. In contrast, if the obtained value is equal to or larger than the reference value of the SCSI-command-timeout monitoring time, then the operation setting unit 18 sets the obtained value as the reference value of the SCSI-command-timeout monitoring time. The reference value is stored in advance by the operation setting unit 18 and, initially, the reference value is used as the SCSI-command-timeout monitoring time for all SCSI commands. The operation setting unit 18 sets the SCSI-command-timeout monitoring time for each obtained SCSI in the firmware 161.

Thus, when the value obtained by subtracting the margin period from the command timeout period is equal to or greater than the reference value, determining the command timeout on the basis of the reference value does not pose any problem because the FC switch 1*a* is able to finish the completion operations. On the other hand, when the value obtained by subtracting the margin period from the command timeout period is smaller than the reference value, the command timeout is determined on the basis of the obtained value. Hence, the FC switch 1*a* becomes able to finish the completion operations before the actual command timeout occurs.

Explained below is the setting regarding the path switching monitoring time during LAN failure. Herein, the operation setting unit 18 obtains the minimum value of the command timeout period from among all command timeout periods obtained in the abovementioned manner from all of the hosts 2.

If the obtained value is equal to a reference value (assumed to be 25 seconds in the second embodiment) of the SCSI-command-timeout monitoring time, then the operation setting unit 18 sets a reference value (assumed to be 25 seconds in the second embodiment) as the path switching monitoring time during LAN failure. This reference value is stored in advance by the operation setting unit 18. If the obtained value is smaller than the reference value of the SCSI-command-timeout monitoring time, then the operation setting unit 18 obtains a value by subtracting a margin period (assumed to be 10 seconds in the second embodiment) from the SCSI-command-timeout monitoring time and sets the obtained value as the path switching monitoring time during LAN failure. However, the minimum value that can be set is assumed to be 10 seconds. Herein, the margin period is kept to ensure that the FC switch 1*a* is able to perform the switching operation. That is, in the second embodiment, the FC switch 1*a* is configured to finish the switching operation in 10 seconds.

As a result, path switching can be performed before the occurrence of the command timeout.

Explained below is the setting regarding the conversion information of error sense contents. Herein, the operation setting unit 18 checks the retry count of all of the error senses and obtains the error senses having the retry count equal to zero. The condition in which the retry count is equal to zero occurs when an error is confirmed based on only a one-time response of an error sense.

From among the error senses having the retry count equal to zero, the operation setting unit 18 excludes the error sense (assumed to be 0x5 in the present embodiment) for which an error can be confirmed based on a one-time response and obtains the error senses to be converted. Thus, those error senses are extracted for which the confirmation of errors is not allowed based on one-time responses.

Meanwhile, in a code, a sense key is the header portion among the portions divided using slash lines. For example, in 0x1/0x00/0x00, 0x1 is the slash key. Regarding the error senses to be converted, the operation setting unit 18 obtains the error senses having the sense keys from 0x0 to 0xf, obtains an error sense having the maximum retry count from among the converted error senses, and retrieves the sense key of that particular error sense. In the present embodiment, although the maximum retry count is selected for the purpose of setting a sufficiently large retry count, desirably in accordance with the operational demands.

Subsequently, the operation setting unit sets the conversion information of error sense contents of the firmware 161 in such a way that the sense key of each error sense to be converted is changed to the sense key of the error sense having the maximum retry count.

As a result, when an error sense to be converted is sent in response to an SCSI command output from the host 2, it becomes possible to perform control in such a way that the error sense is converted to have the registered sense key. Thus, it becomes possible to prevent the flaw in which an error gets confirmed based on only a one-time response of the error senses.

Sequence of Operations in Entirety

Figure 10:
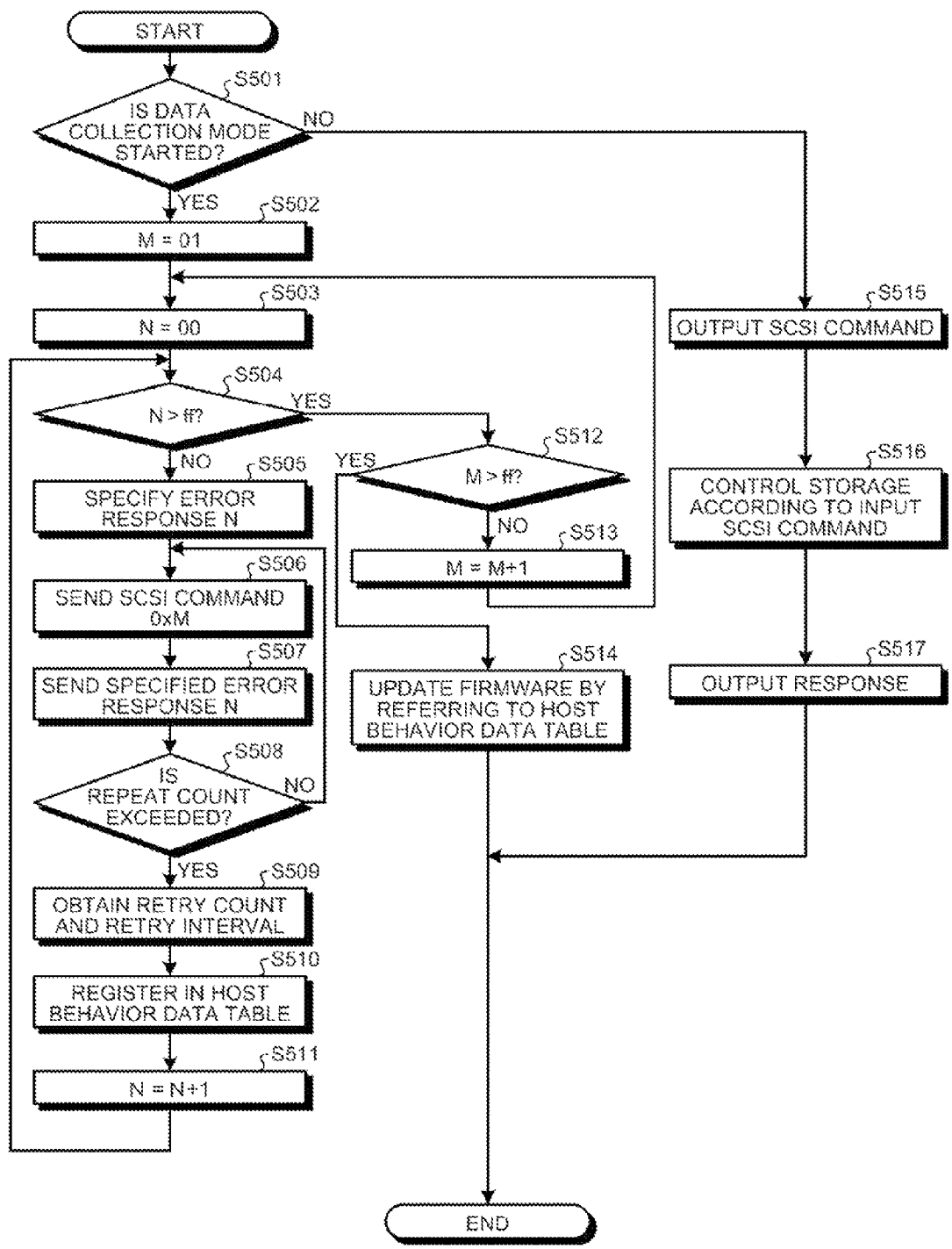
FIG. 10 is a flowchart for explaining the operations in each functioning mode in the storage system including switches according to the second embodiment.

Explained below with reference to FIG. 10 is the operation of updating the firmware 161 in the data collection mode and the operation of communicating data in the operational mode. FIG. 10 is a flowchart for explaining the operations in each functioning mode in the storage system including switches according to the second embodiment. Regarding the explanation of FIG. 10, it is assumed that the firmware 161 and the error responses corresponding to SCSI commands are already stored in the memory unit 16. Herein, for the sake of convenience, the error responses are represented with only the numerical values 00 to ff. Moreover, the SCSI commands are assumed to be commands represented by the codes from 0x01 to 0xff.

Firstly, according to an operator instruction, the execution processing unit 24 determines whether to perform operations in the data collection mode. Based on whether an instruction to start the data collection mode is issued by the control signal output unit 21, the integrated control unit 40 determines whether the data collection mode is started (S501).

If the data collection mode is started (Yes at S501), the execution processing unit 24 sets the value in an SCSI command 0xM to an initial value (M=01) (S502) and sets the value of an error response N to be specified to an initial value (N=0) (S503).

Subsequently, the control signal output unit 21 determines whether N is larger than ff (S504).

If N is equal to or smaller than ff (No at S504), then the control signal output unit 21 requests the integrated control unit 40 to send the error response N (S505). Then, the control signal output unit 21 sends the SCSI command 0xM to the error response output unit 15 (S506); while the error response output unit 15 sends the error response N that has been specified by the integrated control unit 40 to the error handling unit 22 (S507).

The error handling unit 22 determines whether the repeat count that has been stored in advance has been exceeded (S508). If the repeat count is not yet exceeded (No at S508), then the system control returns to Step 5506. On the other hand, if the repeat count has been exceeded (Yes at S508), then the operation information computing unit 17 obtains the retry count and the retry interval for the case when the error response N corresponds to the SCSI command 0xM (S509). Subsequently, the operation information computing unit 17 registers the retry count and the retry interval in the host behavior data table 231 that has been stored in the operation information memory unit 23 of the host 2 (S510). Then, the control signal output unit 21 increments N to N+1 (S511) and the control signal returns to Step S504.

Meanwhile, if N is larger than ff (Yes at S504), then the execution processing unit 24 determines whether M is larger than ff (S512). If M is equal to or smaller than ff (No at S512), then the execution processing unit 24 increments M to M+1 (S513). On the other hand, if M is larger than ff (Yes at S512), then the operation setting unit 18 refers to the host behavior data table 231 and updates the firmware 161 in accordance with the information in the host behavior data table 231 (S514).

Meanwhile, if the mode is not the data collection mode but is the operational mode (No at S501), then the control signal output unit 21 outputs a appropriate SCSI command to the storage control unit 19 (S515). Subsequently, the storage control unit 19 controls the storage 3 with the aim of processing the input SCSI command (S516). Then, the storage control unit 19 outputs the response obtained from the storage 3 to the execution processing unit 24 (S517).

In the present embodiment, by taking into consideration the memory capacity of the FC switch 1a, the host behavior data table 231 of each host 2 is once stored in the corresponding host 2 and the settings of the firmware 161 are performed using that host behavior data table 231. However, if the FC switch 1a has a sufficient memory capacity, then the host behavior data tables 231 of all of the hosts 2 can be stored therein and the settings of the firmware 161 can be performed based on those tables.

Moreover, in the present embodiment, two FC switches, namely, the FC switch 1a and the FC switch 1b are disposed and path switching is performed therebetween. However, it is also possible to have a configuration including only a single FC switch. In that case, the firmware 161 does not include the setting regarding the path switching monitoring time during LAN failure and hence there is no need to update the same. Thus, the configuration is such that only the setting regarding the SCSI-command-timeout monitoring time and regarding the conversion information of error sense contents is updated in the firmware 161.

Furthermore, in the present embodiment, the explanation is given for virtual FC switches as an example. However, the present embodiment is also applicable to normal FC switches that are not in the virtualized state.

As described above, in the present embodiment, it becomes possible to automatically collect the operation information of a newly-connected calculating device. Besides, the operations of an FC switch can be automatically set in synchronization with the operations of a host at the time of a failure without having to depend on the operator to replace the firmware.

Moreover, in the present embodiment, error information on error senses and information for notifying the command timeout is used as the operation information. However, it is also possible to use either of those two types of information. If only the error information is used, then it is possible to change settings of the contents of the error information. If only the information for notifying the command timeout is used, then it is possible to perform settings for either one or both of the SCSI-command-timeout monitoring time and the path switching monitoring time during LAN failure.

However, in the case of using only the command timeout information, there is no need to store the error responses in the memory unit 16 and hence there is no need to configure the error response output unit 15. If the error response output unit 15 is not configured; then, upon receiving an SCSI command from the control signal output unit 21, the operation information computing unit 17 can wait until the subsequent SCSI command is received from the control signal output unit 21. Moreover, in this case, the FC switch 1a does not output any responses other than the error response. That point is identical to the first embodiment and, in that case, the error response output unit 11 and the memory unit 12 are not required.

In this way, when any of the settings is automated, the operations of an FC switch can be set automatically in synchronization with the operations of a host at the time of a failure, without having to depend on the operator to replace the firmware.

Thus, according to an aspect of the present invention on a switch device, a switch control method, and a storage system; without having to depend on the operator to replace the firmware, the operations of a switch can be automatically set in synchronization with the operations of a calculating device at the time of a failure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A switch device comprising:
a memory unit for storing therein an error response for each error event to be sent in response at the time of a failure with respect to a control signal that controls a storage device connected to the switch device;
an error response output unit for receiving input of the control signal and sequentially outputting each error response stored in the memory unit;
an operation information computing unit for detecting an operation of a calculating device, which is connected to the switch device, corresponding to each error response output by the error response output unit and for obtaining, as operation information, a condition defining the operation of the calculating device upon receiving each error response; and
an operation setting unit for setting operation condition at the time of a failure based on the operation information.

2. The switch device according to claim 1, wherein the operation information computing unit detects an operation of the calculating device in a case when there is no error response from the error response output unit corresponding to the input of the control signal and obtains, as operation information, a condition defining the operation of the calculating device at the time of not receiving an error response as well as the condition defining the operation of the calculating device upon receiving each error response.

3. The switch device according to claim 1, wherein
the error response at least includes error information,
at the time when the error response output unit outputs an error response, the operation information at least includes a retry count corresponding to the error information, and
the operation setting unit changes at least the contents of the error information.

4. The switch device according to claim 2, wherein
at the time when the error response output unit does not output an error response, the operation information at least includes a retry count of the calculating device at the time when none of the error responses are received, and
the operation setting unit performs setting of either one of a timeout monitoring time and a communication-path-switching monitoring time.

5. The switch device according to claim 4, wherein the operation setting unit performs setting of the timeout monitoring time, performs setting of the communication-path-switching monitoring time, and changes the contents of the error information.

6. A switch control method comprising:
storing therein an error response for each error event to be sent in response at the time of a failure with respect to a control signal that controls a storage device connected to the switch device;
receiving input of the control signal and sequentially outputting each error response stored in the memory unit;
detecting an operation of a calculating device, which is connected to the switch device, corresponding to each error response output and obtaining, as operation information, a condition defining the operation of the calculating device upon receiving each error response; and
setting operation condition at the time of a failure based on the operation information.

7. A storage system comprising:
a storage device;
a switch device; and
a calculating device, the calculating device performing data reading or data writing with respect to the storage device via the switch device,
the switch device including
a memory unit for storing therein an error response for each error event to be sent in response at the time of a failure with respect to a control signal that controls the storage device connected to the switch device;
an error response output unit for receiving input of the control signal and sequentially outputting each error response stored in the memory unit;
an operation information computing unit for detecting an operation of the calculating device, which is connected to the switch device, corresponding to each error response output by the error response output unit and for obtaining, as operation information, a condition defining the operation of the calculating device upon receiving each error response; and
an operation setting unit for setting operation condition at the time of a failure based on the operation information, and
the calculating device includes
a control signal output unit for outputting the control signal to the switch device; and
an error handling unit for receiving the error response from the switch device corresponding to the control signal output by the control signal output unit and for performing an operation to handle the error response.

* * * * *